United States Patent
Boegner et al.

[19]

[11] Patent Number: 6,161,377

[45] Date of Patent: Dec. 19, 2000

[54] INTERNAL-COMBUSTION ENGINE SYSTEM HAVING A NITROGEN OXIDE STORAGE CATALYST AND AN OPERATING PROCESS THEREFOR

[75] Inventors: Walter Boegner, Remseck; Guenter Karl, Esslingen; Bernd Krutzsch, Denkendorf; Christof Schoen, Remshalden; Dirk Voigtlaender, Korntal-Muenchingen; Guenter Wenninger, Stuttgart, all of Germany

[73] Assignee: DaimlerChrysler AG, Stuttgart, Germany

[21] Appl. No.: 09/178,685

[22] Filed: Oct. 26, 1998

[30] Foreign Application Priority Data

Oct. 25, 1997 [DE] Germany ............ 197 47 222

[51] Int. Cl.[7] ........................................ F01N 3/00
[52] U.S. Cl. ................. 60/274; 60/298; 60/285; 60/289
[58] Field of Search ............... 60/274, 276, 277, 60/285, 286, 299, 295, 297, 289

[56] References Cited

U.S. PATENT DOCUMENTS

| | | | |
|---|---|---|---|
| 5,402,641 | 4/1995 | Katoh et al. ........................ | 60/285 |
| 5,472,673 | 12/1995 | Goto et al. ........................ | 60/285 |
| 5,551,231 | 9/1996 | Tanaka et al. . | |
| 5,722,236 | 3/1998 | Cullen et al. ..................... | 60/274 |
| 5,746,049 | 5/1998 | Cullen et al. ..................... | 60/274 |
| 5,778,666 | 7/1998 | Cullen et al. ..................... | 60/274 |
| 5,832,722 | 11/1998 | Cullen et al. ..................... | 60/274 |

FOREIGN PATENT DOCUMENTS

| | | |
|---|---|---|
| 0 636 770 A1 | 2/1995 | European Pat. Off. . |
| 195 22 165 C2 | 12/1995 | Germany . |
| WO 98/27322 | 6/1998 | WIPO . |

*Primary Examiner*—Thomas Denion
*Assistant Examiner*—Binh Tran
*Attorney, Agent, or Firm*—Evenson, McKeown, Edwards & Lenahan, P.L.L.C

[57] ABSTRACT

An internal-combustion engine system includes an internal-combustion engine with a pertaining engine exhaust gas system, an emissions control device having an $NO_x$ storage catalyst arranged in the exhaust gas system, a lambda probe for detecting the engine air ratio and devices for the periodic desulfurization of the catalyst at a raised temperature and a rich air ratio of the latter, as well as to an operating process suitable for this system. The desulfurization devices comprise secondary air feeding devices for feeding secondary air into the $NO_x$ storage catalyst. During the desulfurization phases, the engine is operated at a rich air ratio and secondary air is metered into the catalyst.

11 Claims, 2 Drawing Sheets

INTERNAL-COMBUSTION ENGINE SYSTEM HAVING A NITROGEN OXIDE STORAGE CATALYST AND AN OPERATING PROCESS THEREFOR

BACKGROUND AND SUMMARY OF THE INVENTION

This application claims the priority of German Patent Application No. 197 47 222.2, filed Oct. 25, 1997, the disclosure of which is expressly incorporated by reference herein.

The present invention relates to an internal-combustion engine system as well as to a process for the operation of such a system. Systems of this type, which are particularly used in motor vehicles, contain an emission control device that comprises a nitrogen oxide ($NO_x$) storage catalyst and possible additional exhaust-gas-purifying components for minimizing nitrogen oxide emission.

In engine operating phases with an increased formation of nitrogen oxide, for example in the case of a lean engine air ratio (i.e., an air/fuel ratio above the stoichiometric value), nitrogen oxide is intermediately stored in the catalyst, for example, by means of an adsorption process. In a later phase which is suitable for this purpose, (e.g., at a rich air/fuel ratio-below the stoichiometric value) the stored nitrogen oxide is released (for example, by means of a corresponding desorption process) and converted by a subsequent reduction to nitrogen. The reduction reaction can take place in this catalyst or in another catalyst situated in the exhaust gas train or while exhaust gas is returned during the desorption phases into the combustion spaces of the engine.

The known difficulty of such systems is that, in the lean operation of the engine, sulfur dioxide is contained in the exhaust gas which, because of a sulfate formation, may result in a sulfur poisoning of the NOx storage catalyst. (The sulfur may originate from the fuel and/or from the engine oil.) Sulfur poisoning decreases the $NO_x$ storage capacity of the catalyst.

In W. Strehlau et al., "New Developments in Lean $NO_x$ Catalysis for Gasoline Fueled Passenger Cars in Europe", *SAE* 96 2047 (1996), the possibility of desulfurization of $NO_x$ storage catalysts sulfur-aged in this manner is described; that is, freeing catalysts from the poisoning sulfate. In this case, suitable conditions are (1) increased exhaust gas temperatures of above 600° C., and (2) rich exhaust gas compositions, i.e, a ratio of oxygen or air to fuel or unburnt hydrocarbons in the exhaust gas is guided through the catalyst below the stoichiometric value. This ratio is called the catalyst air ratio.

European Published Patent Application EP 0 636 770 A1, discloses an internal-combustion engine system in which an existing $NO_x$ storage catalyst is periodically subjected to desulfurization phases. The necessity of a respective desulfurization phase is determined from a detection of the duration of a respective $NO_x$ regeneration phase (a desorption phase of the catalyst), which is determined by means of the measuring signal of a lambda probe arranged downstream of the $NO_x$ storage catalyst. The lambda probe measures the air/fuel ratio at this point and thus the catalyst air ratio on the output side of the catalyst. This ratio decreases as soon as no more nitrogen oxide is released in a desorption phase because then the unburnt hydrocarbons contained in the exhaust gas are no longer consumed as reducing agents for the conversion of desorbed nitrogen oxide.

In the case of a constant operating point, the regeneration duration is proportional to the stored $NO_x$ mass so that a direct conclusion can be drawn concerning the stored $NO_x$ mass. The $NO_x$ mass stored in the lean phase can be calculated, for example, by means of a catalyst model and, from it, the pertaining theoretical regeneration duration can be calculated. If the measured regeneration duration is shorter than the calculated one, a conclusion can be drawn concerning a reduced $NO_x$ storage capacity of the catalyst because of sulfur poisoning. Therefore, a desulfurization phase may be required. As an alternative, the sulfur aging of the $NO_x$ storage catalyst can also be determined by means of an $NO_x$ sensor downstream of the catalyst. If the $NO_x$ concentration rises very rapidly downstream of the catalyst during an adsorption phase, this indicates a reduced $NO_x$ storage capacity.

For implementing desulfurization, it is suggested in EP 0 636 770 A1 to change the internal-combustion engine from a lean to a rich engine air ratio and, as required, additionally activate an electric heating device that is assigned to the $NO_x$ storage catalyst for this purpose. It is known that the engine exhaust gas temperature is lower when a rich air/fuel mixture is supplied to the engine. The desulfurization phase is maintained for approximately 10 minutes.

In Published German Patent Application DE 195 22 165 A1, for implementing the desulfurization phases in an internal-combustion engine system, a rich engine air ratio and a later ignition point is adjusted for the respective engine cylinder. In addition, secondary air is supplied to the exhaust gas upstream of the $NO_x$ storage catalyst. The desulfurization phases are controlled by an engine control device, preferably in such a manner that the catalyst temperature sensed by a corresponding temperature sensor is controlled to a desired increased value by means of a suitable adjustment of the engine air ratio and of the ignition point. For this purpose, some of the cylinders are operated in a rich manner and the other cylinders are operated in a lean manner, with the intake air quantity appropriately increased for the cylinders with the rich combustion operation. In this case, a lowering of the engine power is prevented. The desulfurization phase is in each case maintained for a definable time period.

The object of the present invention is to provide an internal-combustion engine system as well as an operating process therefor, in which periodic desulfurization of the $NO_x$ storage catalyst occurs in the running engine operation, while the engine operating condition is affected as little as possible.

In the case of a first embodiment of the internal-combustion engine system according to the present invention, the desulfurization devices comprise devices for feeding secondary air into the $NO_x$ storage catalyst. The oxygen contained in the secondary air reacts exothermally with a portion of the reducing agent contained in the exhaust gas, such as unburnt hydrocarbons, hydrogen and carbon monoxide. As a result, the catalyst can be brought to the increased temperature which is optimal for the desulfurization (sulfate regeneration) without the requirement (1) of an additional heating from the outside by means of an electric heating device or the like, or (2) that the engine itself must provide correspondingly high exhaust gas temperatures. Furthermore, the internal-combustion engine system contains a lambda probe for detecting the catalyst air ratio which is arranged downstream of the $NO_x$ storage catalyst. Correspondingly, during the desulfurization phases, the internal-combustion engine is operated with a rich engine air ratio in order to provide a sufficient quantity of reducing agents in the exhaust gas, and simultaneously secondary air is metered into the $NO_x$ storage catalyst. In this case, the information of the lambda probe arranged downstream of the $NO_x$ catalyst is used for adjusting the engine air ratio and the secondary air feeding rate.

In a second embodiment of the present invention, a temperature sensor is provided for detecting the temperature of the $NO_x$ storage catalyst or of the exhaust gas guided through it. This temperature information can be used to adjust the engine air ratio and/or the secondary air feeding rate (and therefore the catalyst air ratio) in a manner which differs according to a specific requirement; for example: (1) as a purely protective measure with respect to overheating the catalyst, or (2) for adjusting to a definable desired temperature value.

In a process according to the present invention, the continuous monitoring of the actual value of the catalyst air ratio by the lambda probe downstream of the $NO_x$ catalyst can be utilized to adjust the catalyst air ratio by the variable adjustment of the engine air ratio and/or of the secondary air feeding rate to a definable desired value that is optimal for the desulfurization of the catalyst.

Another embodiment of the system according to the present invention contains an electrically controllable throttle valve in the engine intake system that can be controlled by the desulfurization control which may, for example, be integrated in a central engine control unit. This desulfurization control is utilized for variably adjusting the throttle valve during the desulfurization phases such that the internal-combustion engine generates a desired torque independently of the course of the desulfurization operation. In this manner the power output of the engine, and thus when the engine is used in a motor vehicle the driving condition of the vehicle, remains unaffected by the presence and course of a respective desulfurization phase.

Other objects, advantages and novel features of the present invention will become apparent from the following detailed description of the invention when considered in conjunction with the accompanying drawings.

DETAILED DESCRIPTION OF THE DRAWINGS

Figure 1:
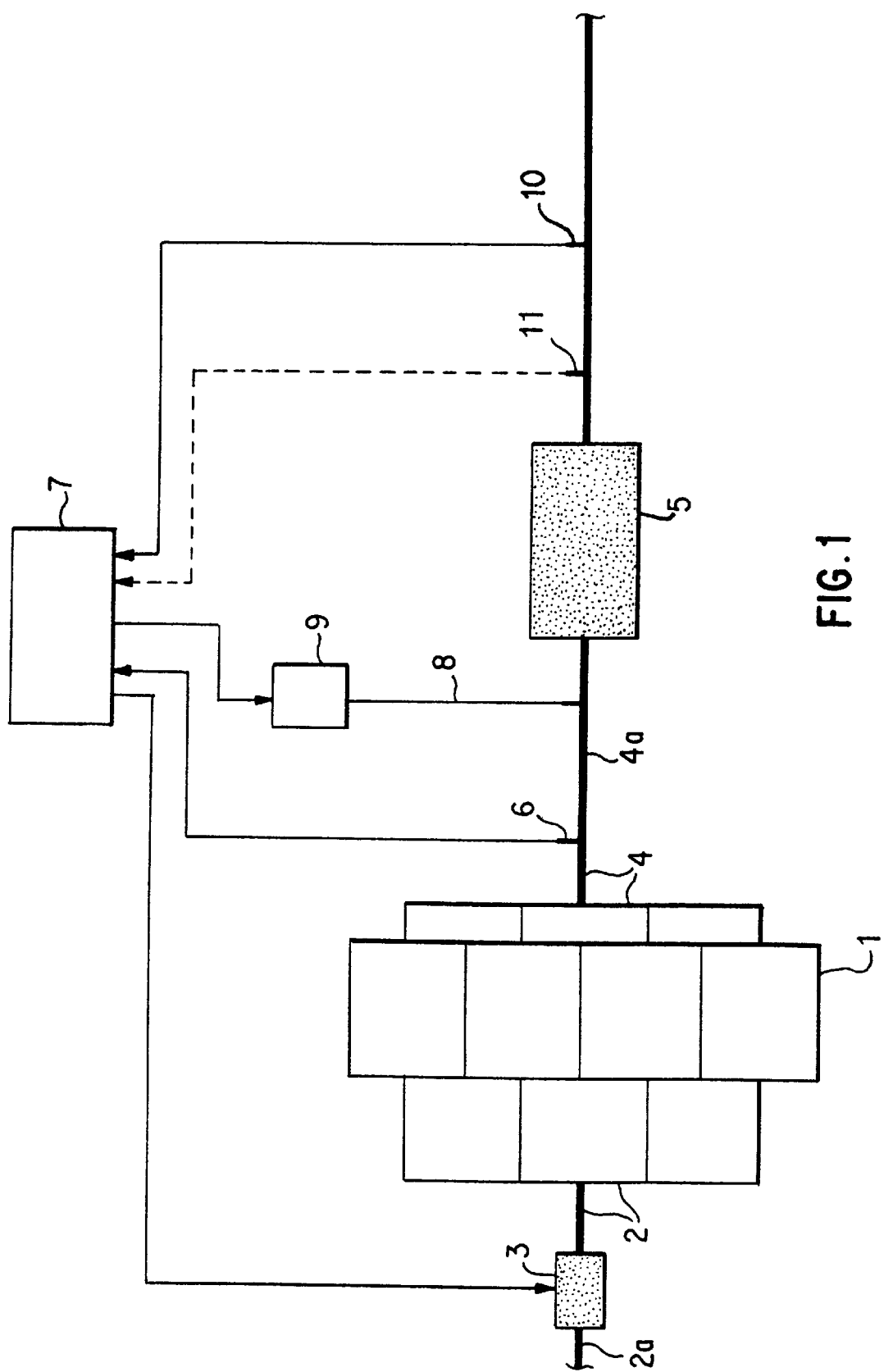
FIG. 1 shows a block diagram of an internal-combustion engine system with an emissions control device with an $NO_x$ storage catalyst and pertaining desulfurization devices.
Figure 2:
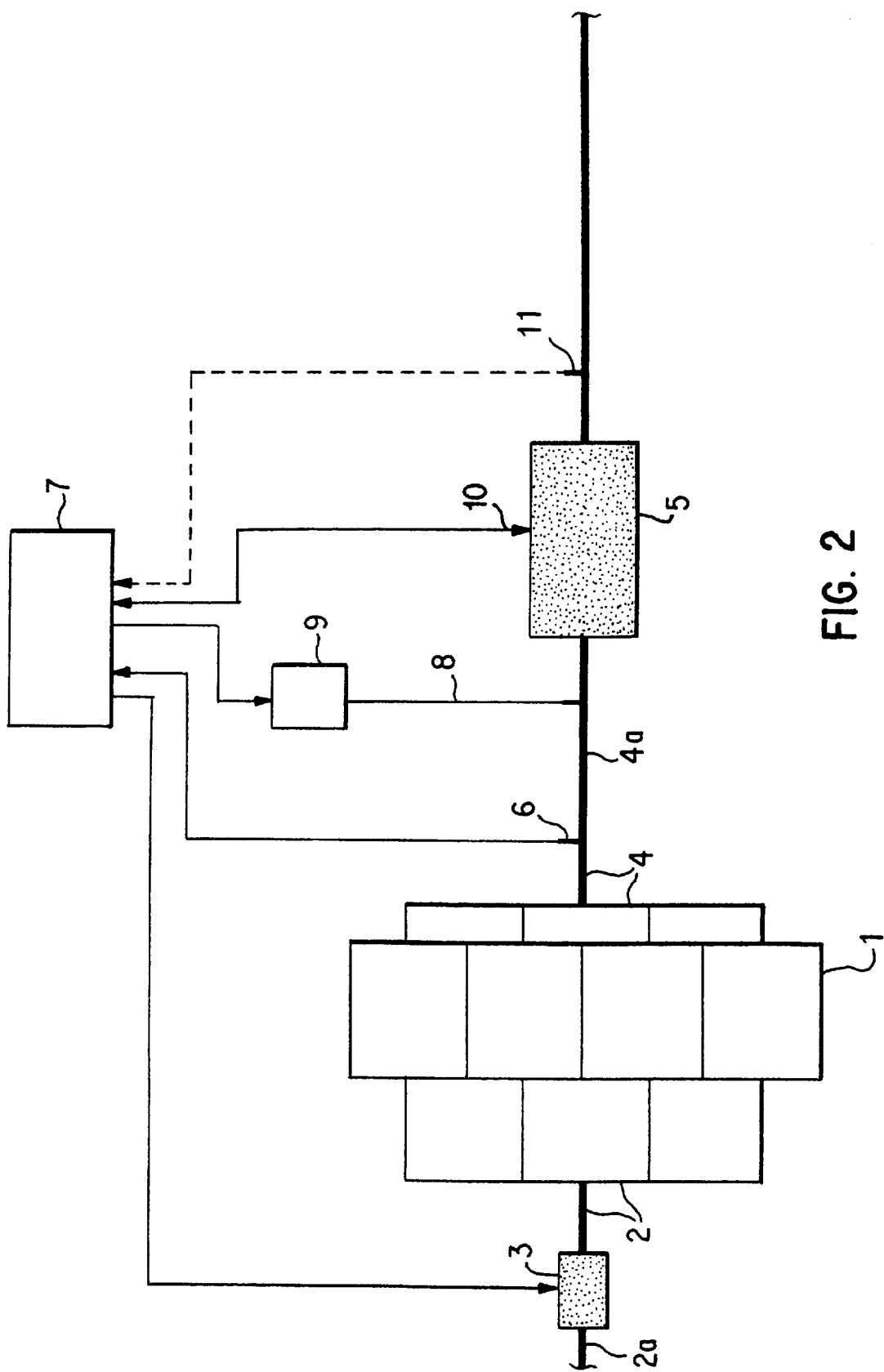
FIG. 2 shows a block diagram in which a temperature sensor is located in the $NO_x$ storage catalyst.

The illustrated internal-combustion engine system contains a multicylinder internal-combustion engine 1 with an intake system 2 and an electrically controllable throttle valve 3 which is arranged in a suction pipe section 2a of the intake system 2 which all cylinders have in common. On the output side, the internal-combustion engine 1 is adjoined by an exhaust gas system 4 at which the exhaust gas outlet pipes coming from the individual cylinders lead into a joint main exhaust gas pipe. An emissions control system is assigned to the exhaust gas system 4, which emissions control system comprises a nitrogen oxide storage catalyst 5 arranged in the main exhaust gas pipe 4a as well as optionally one or several catalyst(s) (not shown). The $NO_x$ storage catalyst 5 is of a conventional type and has the purpose of periodically adsorbing nitrogen oxides contained in the exhaust gas and desorbing them for the purpose of a conversion. Upstream of the $NO_x$ storage catalyst 5, a first lambda probe 6 is inserted into the main exhaust gas pipe 4a in order to measure the air/fuel ratio there and, as a result, detect the engine air ratio.

The output signal of the lambda probe 6 is supplied to an engine control unit 7 which, among other things, triggers the throttle valve 3. In a manner not shown in detail, it also controls the fuel injection in the internal-combustion engine 1 and is therefore capable of adjusting the actual value of the engine air ratio detected by way of the lambda probe 6 to a desired value.

In order to free the $NO_x$ storage catalyst 5 of poisoning sulfate, as required, from time to time, the internal-combustion engine system comprises corresponding desulfurization devices. These consist, of secondary air feeding devices in the form of a secondary air pipe 8 and a pertaining secondary air pump 9 as well as of a desulfurization control which is integrated into the engine control unit 7; that is, the engine control unit 7 also controls the sulfate regeneration operations for the $NO_x$ storage catalyst 5. For this purpose, among other things, the secondary air pump 9 can also be triggered by the engine control unit 7. The secondary air pipe 8 leads between the lambda probe 6 and the $NO_x$ storage catalyst 5 into the main exhaust gas pipe 4a. Furthermore, downstream of the $NO_x$ storage catalyst 5, a temperature sensor 10 is inserted into the main exhaust gas pipe 4a in order to measure the exhaust gas temperature there and thereby detect the temperature in the $NO_x$ storage catalyst 5. The output signal of the temperature sensor 10 is also supplied to the engine control unit 7. As indicated in the figure by a broken line, downstream of the $NO_x$ storage catalyst 5, a second lambda probe 11 is inserted into the main exhaust gas pipe 4a, the output signal of this probe 11 also being supplied to the engine control unit 7. By means of the thus positioned second lambda probe 11, the air/fuel ratio existing there can be measured and the air/fuel ratio in the $NO_x$ storage catalyst 5, that is, the catalyst air ratio, can therefore be detected.

The thus constructed internal-combustion engine system can be operated by a process which is distinguished by special periodic desulfurization phases, as explained in detail in the following, while the remaining systems operation takes place in the normal manner. In particular, the $NO_x$ storage catalyst 5 is alternatingly operated in the adsorption and the desorption mode in order to adsorb nitrogen oxides in the lean operation of the engine and desorb them again in engine operating phases with a richer mixture. In this manner, they can be converted in the catalyst 5 itself or in a different manner, for example, by the exhaust gas return into the intake system. If as the result of a sulfate formation because of sulfur dioxide contained in the exhaust gas, the $NO_x$ storage catalyst 5 experiences a noticeable sulfur aging (i.e., sulfur poisoning), its $NO_x$ storage capacity will decrease with the result that the $NO_x$ concentration rises comparatively rapidly downstream of the catalyst 5 during the adsorption phases, which can be detected in a manner not shown by an $NO_x$ sensor positioned there. In addition, the regeneration duration of the $NO_x$ storage catalyst 5 (the duration of the desorption phases) is reduced, which as explained above, can be detected, for example, by means of a lambda probe, such as the illustrated second lambda probe 11, arranged downstream of the $NO_x$ storage catalyst.

As soon as the desulfurization control (that is, the engine control unit 7) determines that the $NO_x$ storage catalyst 5 exhibits a noticeable sulfur poisoning, a desulfurization phase is activated. For this purpose, the engine control unit 7 adjusts a sufficiently rich air/fuel ratio for the engine 1 by means of the corresponding fuel injection and the feedback of the actual value of the engine air ratio by way of the output signal of the first lambda probe 6. Simultaneously, independently of this engine air ratio determined by the desulfurization process, the engine control unit 7 adapts the torque delivered by the engine to the respective required desired value in that it correspondingly triggers the electronic throttle valve 3. Simultaneously, by activating the secondary air pump 9, the engine control unit 7 causes the metered addition of secondary air by way of the secondary air pipe 8 into the main exhaust gas pipe 4$a$, for the purpose of which a suitable metering device is provided at the outlet of the secondary air pipe 8.

In this manner, reducing agents contained in the exhaust gas of the rich-operated engine 1, particularly unburnt hydrocarbons, hydrogen and/or carbon monoxide, arrive in the $NO_x$ storage catalyst 5, and react with the air oxygen contained in the secondary air on the catalyst surface. By means of this reaction, a high quantity of heat is released which leads to the desired heating of the $NO_x$ storage catalyst 5 and thus more than compensates the reduction of the exhaust gas temperature because of the change to the rich engine operation. In this case, the catalyst air ratio is the result of the engine air ratio and the air quantity added by metering by the secondary air pump 9. This air ratio in the $NO_x$ storage catalyst 5 is measured by means of the second lambda probe 11.

For an optimal course of the desulfurization operation, the engine control unit 7, as the desulfurization control, changes the engine air ratio and the secondary air flow as a function of the output signals of the second lambda probe and of the temperature sensor 10 such that a rich air ratio and a sufficiently high temperature exist in the $NO_x$ storage catalyst 5. It is possible to keep the secondary air quantity constant, and to adapt the engine air ratio to the secondary air quantity such that the catalyst air ratio desired for the desulfurization process is set. As a second possibility, a variable, controllable secondary air quantity may be provided. The metered-in secondary air quantity is then adapted to the engine air ratio such that the desired rich air ratio is formed again in the $NO_x$ storage catalyst 5.

As the result of the presence of the second lambda probe 11, the catalyst air ratio can be directly determined and, by way of the resulting feedback, can be adjusted to a value which is optimal for the sulfate decomposition, preferably between approximately 0.75 and 0.99. Simultaneously, by means of the temperature sensor 10, an optimal temperature for the sulfate decomposition can be adjusted, preferably a temperature of more than 550° C. In addition, during the desulfurization process, the temperature sensor 10 can provide protection against damaging the catalyst by overheating. The charged quantity of reduction agents, which is a function of the engine air ratio, and the amount of oxygen charged by way of the secondary air can therefore be adjusted by the desulfurization control 7 such that optimal sulfate decomposition conditions exist in the $NO_x$ storage catalyst 5 during the respective desulfurization phase.

As soon as the sulfate in the $NO_x$ storage catalyst 5 has been essentially completely decomposed by the desulfurization operation (which either is determined by the sensing of the reaction partners participating in the decomposition reaction, or is ensured by a sufficiently long duration of the desulfurization phase), the internal-combustion engine system is changed again to its normal operation, in which the $NO_x$ storage catalyst 5 is operated in an alternating manner in the adsorption and in the desorption mode. When the internal-combustion engine system is used in a motor vehicle, the periodic implementation of the desulfurization phases has no disadvantageous influence on the driving condition of the vehicle because, as mentioned above, the engine control unit adapts the engine torque by the corresponding triggering of the electronic throttle valve 3 independently of the selected engine air ratio, to the respective driver's wish. The desulfurization phases can therefore be activated during a continuous driving operation with out reducing the driving comfort.

The foregoing disclosure has been set forth merely to illustrate the invention and is not intended to be limiting. Since modifications of the disclosed embodiments incorporating the spirit and substance of the invention may occur to persons skilled in the art, the invention should be cons trued to include everything within the scope of the appended claims and equivalents thereof.

What is claimed is:

1. An internal-combustion engine system, comprising:
    a combustion engine having an exhaust gas system;
    an emissions control device comprising an $NO_x$ storage catalyst arranged in the exhaust gas system;
    a first lambda probe for detecting an engine air ratio upstream of the $NO_x$ storage catalyst;
    a second lambda probe for detecting a catalyst air ratio downstream of the $NO_x$ storage catalyst; and
    desulfurization devices for a periodic desulfurization of the NOx storage catalyst at a raised temperature and with a rich catalyst air ratio, said desulfurization devices comprising:
    a desulfurization control that controls the periodic desulfurization at least as a function of the catalyst air ratio of the second lambda probe; and
    a secondary air feeding device for feeding secondary air into the $NO_x$ storage catalyst.

2. The internal-combustion engine system according to claim 1, further comprising:
    a temperature sensor for sensing a temperature in the $NO_x$ storage catalyst, wherein said sensor is arranged in the $NO_x$ storage catalyst.

3. The internal-combustion engine system according to claim 1, further comprising:
    a temperature sensor for sensing a temperature in the $NO_x$ storage catalyst, wherein said sensor is arranged downstream of the catalyst.

4. The internal-combustion engine system according to claim 1, further comprising an engine intake system throttle valve that is electrically triggered by the desulfurization control.

5. A process for the operation of an internal-combustion engine system, comprising:
    operating an internal-combustion engine at a rich engine air ratio and metering air into a $NO_x$ storage catalyst by way of a secondary air feeding device, thereby desulfurizing the $NO_x$ storage catalyst at a raised temperature;
    wherein said operating and said metering are variably adjusted at least as a function of an output signal of a lambda probe arranged downstream of the $NO_x$ storage catalyst.

6. The process according to claim 5, further comprising:
    measuring at least one of an engine air ratio, a catalyst air ratio and a catalyst temperature; and
    adjusting the catalyst air ratio and the catalyst temperature to defined values by the adjusting at least one of the engine air ratio and the metering of air.

7. The process according to claim 5, further comprising:
    during said desulfurizing, triggering an engine intake system throttle valve, thereby delivering a torque independently of the engine air ratio.

8. The process according to claim 6, further comprising:
during the desulfurizing, triggering an engine intake system throttle valve, thereby delivering a torque independently of the engine air ratio.

9. The process according to claim 6, wherein the catalyst air ratio is between about 0.75 and 0.99.

10. The process according to claim 6, wherein the catalyst temperature is more than 550° C.

11. The process according to claim 5, wherein said catalyst air ratio is continuously monitored.

* * * * *